July 29, 1941.                    T. C. FANSHIER                    2,251,123
                          MOTOR DRIVEN FISHING REEL
                            Filed April 17, 1939              2 Sheets-Sheet 1
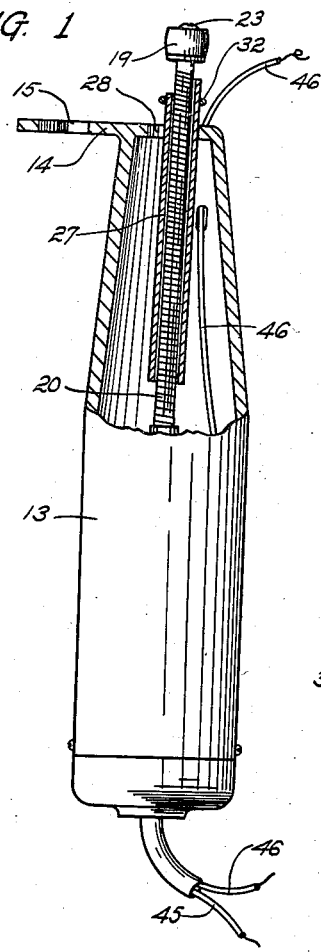
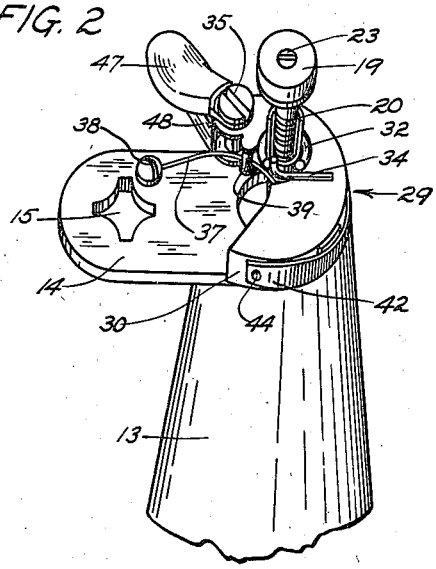
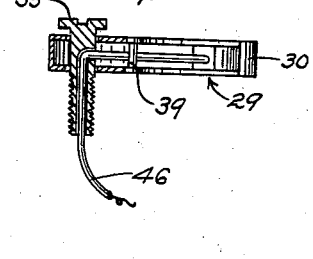
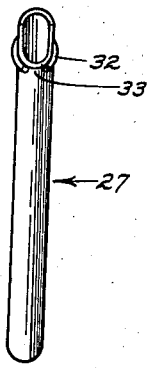
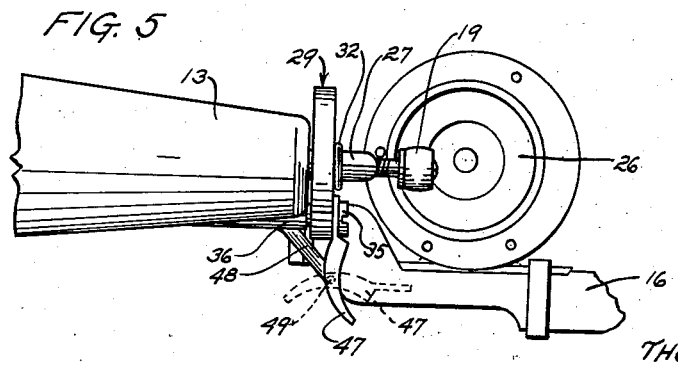
THOMAS C. FANSHIER
INVENTOR
BY Hubert Miller
ATTORNEY July 29, 1941.   T. C. FANSHIER   2,251,123
MOTOR DRIVEN FISHING REEL
Filed April 17, 1939   2 Sheets-Sheet 2
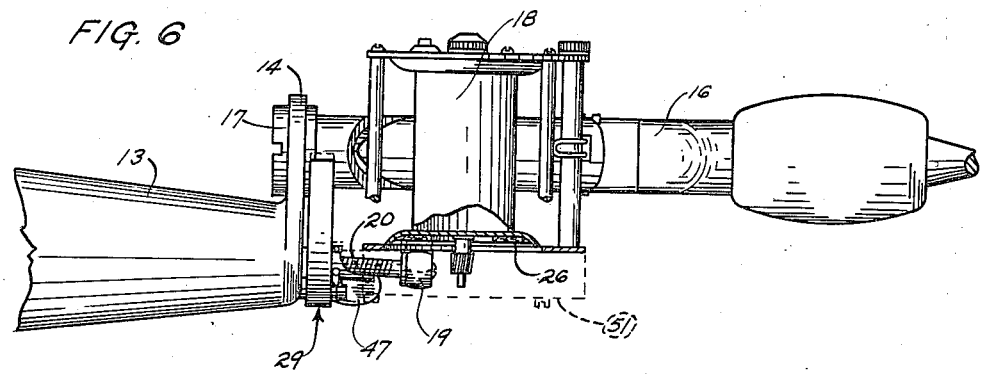
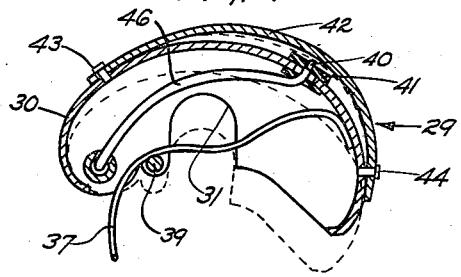
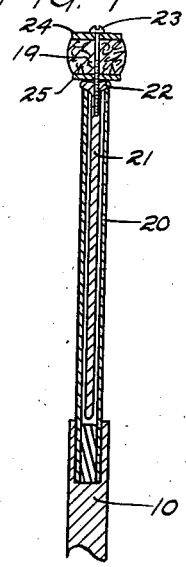
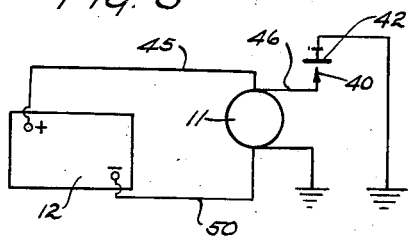
THOMAS C. FANSHIER
INVENTOR
BY Hubert Miller
ATTORNEY Patented July 29, 1941

2,251,123

UNITED STATES PATENT OFFICE 2,251,123

MOTOR DRIVEN FISHING REEL

Thomas C. Fanshier, Oklahoma City, Okla.

Application April 17, 1939, Serial No. 268,299

5 Claims. (Cl. 43—21)

This invention relates to a motor driven fishing reel and to a motor drive attachment for mounting on an ordinary rod for driving an ordinary reel.

Automatic fishing reels are old and well known. They are ordinarily of the spring driven type.

It is the chief object of this invention to provide an electric motor driven means for rewinding the reel after a cast has been made.

The details in the construction of a preferred form of my invention, together with other objects attending its production, will be better understood from the following description when read in connection with the accompanying drawings, which are chosen for illustrative purposes only, and in which, Figure 1 is a side elevation of a combination motor housing and rod handle partially in section and illustrates particularly the manner of mounting the driver on the motor shaft;

Figure 2 is a perspective view of the upper end of the motor housing shown in Figure 1, with a thumb piece for engaging the driver with the follower;

Figure 3 is a side view of the thumb piece partially in section and shows particularly the manner of wiring the thumb piece for controlling the operation of the motor;

Figure 4 is a perspective view of a sleeve which normally surrounds the drive shaft, and which is shown in section in Figure 1;

Figure 5 is a side elevation of a portion of the motor housing and thumb piece assembled, and shows particularly the relation of these parts to the rod and reel, the latter being shown in dotted lines;

Figure 6 is a plan view of a portion of the rod, reel, and driving means, and shows particularly the relative assembled positions of these members, parts of the reel being shown in section;

Figure 7 is a longitudinal section through the thumb piece and the motor switch;

Figure 8 is a diagrammatic view of the electric circuit; and,

Figure 9 is a sectional view through the flexible drive shaft and shows the manner in which the driver is mounted to rotate with the motor shaft.

Like characters of reference designate like parts in all the figures.

Referring to the drawings, I contemplate the use of a small electric motor as the motive power, the shaft 10 of the motor being visible in Figure 9, and the commutator being illustrated diagrammatically at 11 in Figure 8. It is preferably a D. C. motor of usual construction adapted to be operated by a storage battery 12, though it may be an A. C. motor if another source of electric energy is available, as on a large boat.

The motor is removably encased in an elongated metal housing 13 (see Fig. 1 particularly) which has an integral flange 14 near its forward end and a perforation 15 in the flange to facilitate the connection of the housing to a fishing rod 16 by means of a stud 17. This flange 14 together with its perforation 15 serves as a means of offsetting the housing 13 from the longitudinal axis of the pole 16. The housing 13, when attached to the pole 16 as shown in Fig. 6 serves as a handle for the pole.

Figure 9 illustrates the manner in which a driver 19 is mounted to rotate with the motor shaft 10. The end of the motor shaft 10 is bored, as shown, and one end of the flexible shaft 20 is soldered, welded, or otherwise suitably secured in this bore. The other end of the flexible shaft 20 receives a rigid shaft 21, the outside diameter of which is slightly smaller than the inside diameter of the flexible shaft. One end of the shaft 21 is enlarged as at 22 and is welded or otherwise suitably secured to the adjacent end of the flexible shaft 20. This enlarged end of the shaft 21 is centrally bored and threaded to receive a lefthand screw 23, which holds the driver 19 firmly in position against the enlarged end 22 of the shaft 21. The driver is preferably made of leather or any suitable composition and its opposite ends are supported respectively by small metal washers 24 and 25. With such an arrangement it will be seen that the flexible shaft 20 serves as a sort of universal joint, permitting the driver 19 to be moved out of alignment with the axis of the motor shaft 10, the bend in the flexible shaft being effected at a point between the adjacent ends of the shaft 21 and the motor shaft 10 only. The shaft 21 permits any substantial flexing of the shaft 20 at any other points.

Referring now more particularly to Figures 5 and 6, it will be seen that one end of the reel drum or spool 18 is fitted with an annular element 26, one surface of which is glued or otherwise suitably secured to the end surface of the drum. The driver, when the housing 13 is secured to the rod 16, is in a position to frictionally engage the exposed surface of the annular element 26 to rotate the drum 18. Normally the surface of the driver is spaced slightly away from the adjacent surface of the annular element 26.

As a means of effecting frictional engagement of the driver with the follower, I provide a sleeve 27 (Figure 4) which loosely surrounds a portion of the flexible shaft 20, as shown in Figure 1; and means for applying pressure to the outer end of the sleeve 27 in a direction to cause the driver to contact the follower, which in this case is the reel drum 18 and its annular element 26 combined as a unit. It will be noted that the forward end of the housing 13 is provided with a perforation 28 which is sufficiently large to afford movement for the sleeve 27 and the enclosed flexible shaft 20. To apply this sidewise pressure to the end of the sleeve 27 I provide a substantially arcuate thumb piece, designated as a whole by the numeral 29, and illustrated in section in Figure 7. This thumb piece is formed from a pair of substantially arcuate side wall members and a peripheral wall 30 spacing the side walls apart. Each of the side wall members is provided with a cutout portion 31 (Fig. 7) which cutout portions are aligned and are of a size to receive and snugly fit around the sleeve 27. The sleeve 27 is provided near its upper end with a flange 32 in which there is a gap 33. Co-operating with the sleeve is a small dog 34 (Fig. 2) which is rigidly secured to the exterior surface of one wall of the thumb piece 29. One end of this dog is bent to fit into the gap 33 of the flange 32 and contacts one end of the flange 32, thus preventing rotation of the sleeve as the flexible shaft 20 rotates. The entire thumb piece 29 is pivotally mounted on the forward end of the housing 13 by means of a pivot pin 35, which is shown in detail in Figure 3, and which screws into a lug 36 (Fig. 5) formed at the forward end of the housing 13. With the thumb piece mounted as just described on the end of the housing 13, it will be seen that when thumb pressure is applied to the edge of the thumb piece 29, the thumb piece will be moved to the position shown by the dotted lines in Figure 7, and the sleeve 27 will be moved in the same direction, thus forcing the flexible shaft 20 and its connected driver 19 into contact with the annular element 26 on the drum. As a means of normally maintaining the driver in a position out of contact with the element 26, I provide a spring 37, one end of which is rigidly mounted on the flange 14 by means of a screw 38 (Fig. 2), the intermediate portion of which bears against the inside surface of a space bar 39, bridges the arcuate cutaway portions 31, and the opposite end of which bears against the inner surface of the wall 30 of the thumb piece. The spring thus not only serves to normally maintain the thumb piece at one end of its throw, but also serves to maintain the sleeve 27 in its position in the cutaway portion of the thumb piece.

The motor controlling switch will now be described. A stationary switch contact element 40 is mounted on the exterior surface of the wall 30 of the thumb piece, as shown in Figure 7, this element being insulated from the wall proper by means of fiber washers 41. A movable switch contact element 42 is formed from a flexible leaf spring, one of its ends being rigidly attached to the wall 30 at 43, and its opposite end being rigidly attached to the wall 30 at 44, the spring being slightly bowed between the points 43 and 44 to normally maintain it out of contact with the fixed contact element 40.

From Figure 8 it will be seen that I employ a grounded circuit for operating the motor. The positive electrode of the battery is connected to one of the motor brushes as well as to the fixed contact element 40, by means of insulated conductors 45 and 46. The movable contact element 42 is grounded. The negative pole of the battery 12 is connected to the other motor brush by means of an insulated conductor 50, which is then grounded. Thus when the switch contact elements 40 and 42 are moved into actual contact the circuit is closed.

As an incidental feature of the invention I provide a finger rest 47 which is pivotally secured intermediate its ends to the outer end of a brace 48, the opposite end of which is integral with or rigidly secured to the forward end of the housing 13. The brace and finger piece are in alignment with the pivot pin 35 and one end of the finger rest is in the form of an eyelet and is held in position by the pivot pin 35. When it becomes necessary to remove the thumb piece 29 for any reason, the pivot pin 35 is simply unscrewed and the finger piece 47 pivoted around its axis 49 to the position shown in the dotted lines in Figure 5.

With the thumb piece 29 mounted in position on the housing 13, as shown in Figure 2, and the housing mounted in position on the rod 16, as shown in Figure 6, it will be understood that in order to rotate the drum 18 it is only necessary to apply pressure on the contact element 42 at a point adajacent the location of the contact element 40. This causes the two contact elements to meet and starts the motor shaft 10 and the flexible shaft 20 to rotating. Further pressure applied by the thumb in the same direction forces the sleeve 27 to contact the exterior of the flexible shaft 20 and to move the flexible shaft toward the drum 18. The driver 19 contacts the annular element 26 affixed to the end of the drum and thus rotates the drum. Thumb pressure on the contact element 42 and indirectly on the thumb piece 29, controls the frictional engagement of the driver with its follower as well as the electrical contact of the two switch elements.

The dotted lines in Figure 6 represents a casing which is secured to the end of the reel in the usual manner and which simply serves to protect the driver 19 as well as the bearings of the reel, against dirt and dust. This casing is designated by the numeral 51.

While I have described and illustrated a specific embodiment of my invention, I am aware that numerous alterations and changes may be made therein without transcending the inventive principle, and I do not wish to be limited except by the prior art and by the scope of the appended claims.

I claim:

1. A power drive for the reel spool of a fishing rod and reel comprising: an electric motor mounted on the rod in proximity to the reel; a friction facing concentrically fixed on one end of the reel spool; a driver mounted to rotate with the motor shaft; and means for selectively effecting engagement of the driver with said friction facing for rotating the spool.

2. A power drive for the reel spool of a rod and reel comprising: an electric motor mounted on the rod in proximity to the reel; a friction facing concentrically fixed on one end of the reel spool; a driver mounted to rotate with the motor shaft; and a thumb piece mounted for limited pivotal movement adapted to selectively control the operation of said motor and to successively and selectively effect engagement of the driver with said friction facing for causing rotation of the spool.

3. A power drive for the reel spool of a fishing rod and reel comprising: an electric motor mounted on the rod in proximity to the reel; a flexible shaft having one end secured to the motor shaft to rotate therewith; a driver mounted on the opposite end of said flexible shaft at a point adjacent one end of the reel spool; means preventing any substantial flexing of said flexible shaft save at a point adjacent its connection to said motor shaft; a friction facing concentrically fixed on that end of the reel spool adjacent said driver; and a control member for selectively forcing said driver to move toward the reel spool and into operative contact with the friction facing thereon to rotate the spool.

4. A power drive for the reel spool of a fishing rod and reel comprising: an electric motor mounted on the rod in proximity to the reel; a flexible shaft having one end secured to the motor shaft to rotate therewith; a driver mounted on the opposite end of said flexible shaft at a point adjacent one end of the reel spool; a rigid sleeve for a portion of the flexible shaft intermediate the motor shaft and the driver; a friction facing concentrically fixed on that end of the reel spool adjacent said driver; a control member for forcing said sleeve to move the encased portion of said flexible shaft toward the reel spool thus forcing the driver into operative contact with the friction facing on said reel spool for rotating the spool; and a switch for controlling the operation of said motor.

5. In a power drive for the reel spool of a rod and reel which includes a driver driven by a motor and adapted to drive the reel spool, a thumb piece control member for selectively controlling operation of the motor and for selectively controlling the driving of the reel spool by the driver, comprising: a thumb piece mounted for limited pivotal movement and adapted to effect a driving connection between the driver and the reel spool when the piece is pivoted in one direction about its axis; a spring for normally maintaining said thumb piece in inoperative position; a switch contact element insulated from said thumb piece and protruding above the surface of one side edge thereof; and a leaf spring switch contact element having its ends rigidly secured in spaced relation along the surface of said side edge of the thumb piece, its intermediate portion lying substantially above the first mentioned contact element, and being slightly bowed to keep it spaced therefrom; whereby thumb pressure exerted on said leaf spring switch contact element first causes its intermediate portion to contact the first mentioned switch contact element thus starting the motor, and further pressure exerted in the same direction causes said thumb piece to pivot away from its normally inoperative position and by said movement to effect a driving connection between said driver and the reel spool.

THOMAS C. FANSHIER.